United States Patent

[11] 3,552,463

| [72] | Inventor | Wilmer E. Witt |
| | | Appleton, Wis. |
| [21] | Appl. No. | 778,599 |
| [22] | Filed | Nov. 25, 1968 |
| [45] | Patented | Jan. 5, 1971 |
| [73] | Assignee | Koehring Company |
| | | Milwaukee, Wis. |
| | | a corporation of Wisconsin |

[54] EAR CORN ADAPTER FOR FORAGE HARVESTERS
8 Claims, 3 Drawing Figs.

[52] U.S. Cl. .................................................. 146/120, 146/118
[51] Int. Cl. .................................................. A01d 55/00
[50] Field of Search ........................................... 146/120, 118, 119, 112, 109, 79

[56] References Cited
UNITED STATES PATENTS

| 2,254,776 | 9/1941 | Eissmann .................... | 146/118X |
| 2,450,277 | 9/1948 | Frudden ...................... | 146/120 |
| 3,431,712 | 3/1969 | Probsting .................... | 146/120X |

Primary Examiner—W. Graydon Abercrombie
Attorneys—Arthur L. Morsell, Jr. and Curtis Morsell, Jr.

ABSTRACT: The adapter comprises a pair of spaced arms which are removably connectible to the sidewalls of the throat of a forage harvester, the inner ends of the arms having projecting studs which are removably inserted in the ends of a pipe to support the pipe in a predetermined position between the inner end of the apron feed conveyor and the smooth feed roll over which material is fed to the rotary cutter of the forage harvester, the pipe insuring proper feeding of ear corn from the conveyor into the rotary cutter without jamming.

PATENTED JAN 5 1971

3,552,463

INVENTOR
Wilmer E. Witt
BY
Morsell & Morsell
ATTORNEYS 3,552,463

EAR CORN ADAPTER FOR FORAGE HARVESTERS

BACKGROUND OF THE INVENTION

1. Field of the Invention

The present invention is used in connection with forage harvesters and is designed to extend the usage of the latter and permit ear corn to be successfully fed from the harvester apron into the rotary cutter.

2. Description of the Prior Art

Heretofore forage harvester aprons have been used in conjunction with various types of harvesting units to feed the harvested crop to the rotary cutter of the forage harvester. It is often desirable to be able to use a corn snapper in conjunction with a forage harvester but, inasmuch as a corn snapper separates the ears from the stalks, trouble has been encountered because the separated ear corn became jammed between the end of the feed apron and the lowermost of the feed rolls leading to the rotary cutter. This created a substantial problem. It is also frequently desirable to be able to use the rotary cutter of a forage harvester at the silo as a grinder for making ear corn silage. However, because of the problems in using the forage harvester apron to feed ear corn to the rotary cutter it has heretofore been necessary to provide an attachment whereby ear corn could be fed directly into the top of the rotary cutter of a forage harvester, thus avoiding the conveyor apron. This type of arrangement was complicated and expensive.

SUMMARY OF THE INVENTION

The present invention provides a simple, three-piece adapter which can be quickly installed or removed from a forage harvester to adapt it for use with ear corn, the adapter including a tubular member which is located in a predetermined position between the inner end of the apron and the lower feed roll for the rotary cutter to prevent ear corn from jamming between the inner end of the feed conveyor and the lower feed roll for the cutter, and to cause said ear corn to be properly directed between the cutter feed rolls.

A further object of the invention is to provide an ear corn adapter for forage harvesters which is inexpensive, which extends the usage for forage harvesters, which increases the capacity, which is easy to install and remove, and which is otherwise well adapted for the purposes described.

BRIEF DESCRIPTION OF THE DRAWINGS

In the accompanying drawings, in which the same reference numerals designate the same parts in all of the views.

DESCRIPTION OF THE PREFERRED EMBODIMENTS

Figure 1:
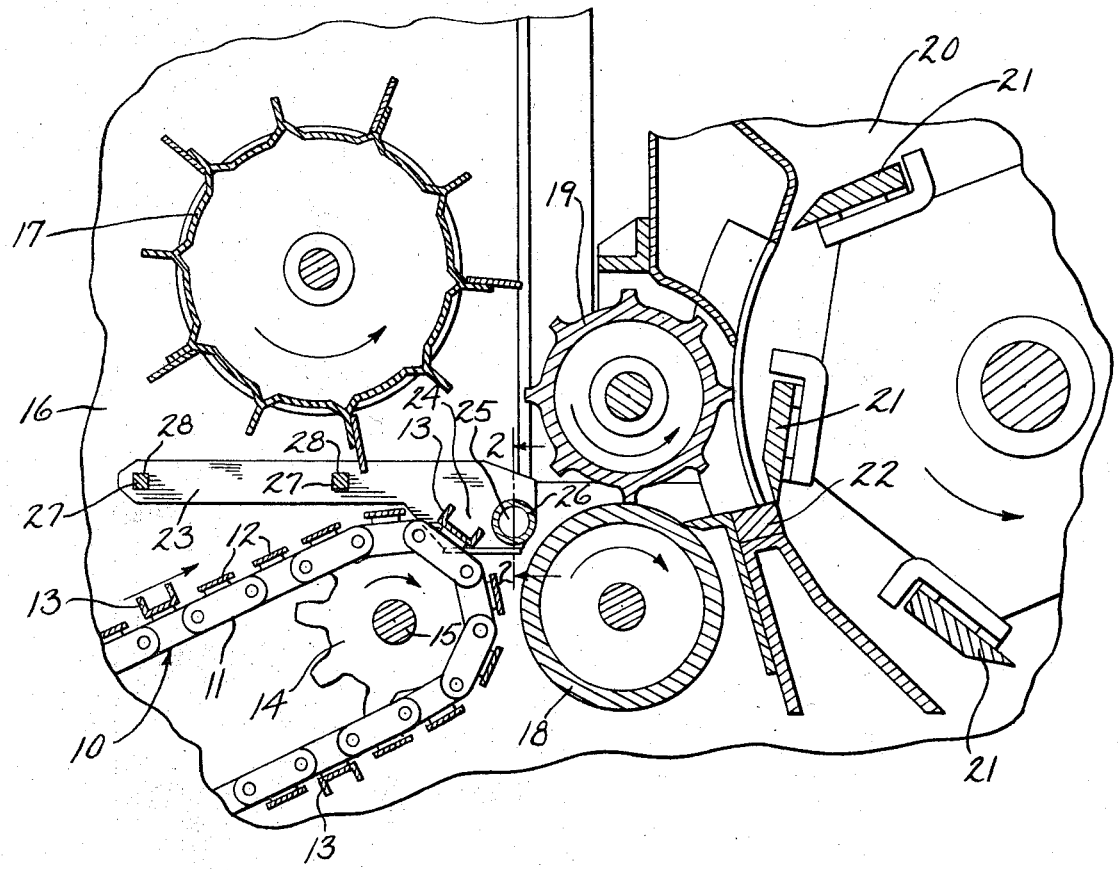
FIG. 1 is a fragmentary longitudinal vertical section through a forage harvester showing the improved adapter in operative position.

Referring more particularly to FIG. 1 of the drawings, the numeral 10 designates the upper portion of an endless inclined feed conveyor of a forage harvester, which conveyor is sometimes called the feed apron. This conveyor customarily includes spaced endless chains 11 carrying horizontal slats 12, some of which are in the form of U-shaped flights 13 to project outwardly a greater distance. The endless conveyor operates around sprocket wheels 14, the upper set being illustrated in the drawing. The sprocket wheels 14 are mounted on a transverse shaft 15 which extends between upright walls 16 forming the forage harvester throat. Rotatably mounted between the upright walls 16 in the throat is the usual paddle wheel 17 which holds the material downwardly on the feed conveyor 10 as the material is being conveyed upwardly.

As is customary in forage harvesters, the feed conveyor is adapted to deliver the material to a pair of feed rolls 18 and 19. The upper roll 19 is customarily provided with transverse lugs and the lower feed roll 18 is customarily smooth. The feed rolls are adapted to deliver the material into a rotary cutter 20 of conventional form, which cutter is of the reel type having cutting blades 21 which coact with a stationary cutting knife 22. The above is all conventional forage harvester mechanism.

The present invention provides a three-piece ear corn adapter. It includes a pair of attachment arms 23, one for each of the upright walls 16. Each arm has a plate extension 24 depending from its lower edge at the forward end thereof, and each plate carries a stud 25. The studs are removably insertable in the ends of an antijamming member in the form of a pipe 26 to support the latter in the position shown in FIG. 1 in the trough formed between the inner end of the endless conveyor 10 and the surface of the lower feed roll 18.

Each arm 23 is removably bolted to its wall portion 16 by bolts 27 which preferably have square portions extending through square holes 28 in the arms. It may be seen from FIG. 1 that the pipe 26 is so supported that the left side of the pipe leaves sufficient space between the pipe and the inner end of the feed conveyor to allow the U-shaped flights 13 to pass, but insufficient space for ear corn to pass downwardly. The pipe is located in the V formed between the inner portion of the feed conveyor 10 and the roll 18. The uppermost portion of the pipe is approximately the same elevation as the top of the feed roll 18.

With this adapter in position, ear corn being fed by the conveyor 10 will be directed by the curvature of the pipe over the top thereof into the bite between the feed rolls 18 and 19, so that the ear corn will be properly fed between feed rolls 18 and 19 into the rotary cutter 20.

Prior to use of the present invention ear corn would fall into the bottom of the V between the conveyor 10 and feed roll 18 and become jammed therein. This caused substantial problems and, therefore, the usual forage harvester apron was not suitable for feeding ear corn to the cutter. Instead, it had heretofore been necessary to provide special means for feeding ear corn into the cutter from the top at approximately the location of the lead line for the numeral 20. With the present invention the forage harvester may be used as a stationary grinding unit, whenever desired, at the silo or storage structure.

Figure 2:
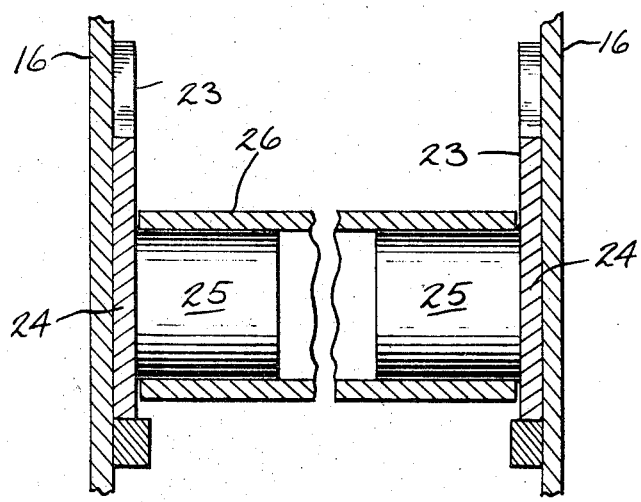
FIG. 2 is a sectional view taken approximately on the line 2-2 of FIG. 1.
Figure 3:
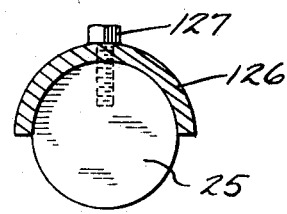
FIG. 3 is a transverse sectional view showing a modification.

While it is preferred to employ a full pipe 26 as shown in FIGS. 1 and 2, the modification of FIG. 3 discloses the use of a half pipe 126, the ends of which are seated on the studs 25 and removably held in place by screws 127.

When forage harvesters are used for most crops such as hay silage, then it is undesirable to have the adapter in position. The present invention makes it easy to install or remove the adapter at will. When it is desired to convert the forage harvester to conventional form it is merely necessary to remove the bolts 27 and remove the two arms 23. These can then be readily separated from the pipe 26 so that the three parts can be compactly stored until again needed.

The three-piece construction makes it easy to install the adapter, it being merely necessary to insert the studs 25 into the pipe ends 26 and then slip the assembly into place as shown in FIG. 1.

Various changes and modifications may be made without departing from the spirit of the invention, and all of such changes are contemplated as may come within the scope of the claims.

I claim:

1. In a forage harvester having a throat with spaced sidewalls, having a rotary cutter, having upper and lower feed rolls for feeding material to the cutter, and having an upwardly inclined endless conveyor with transverse flights for delivering harvested material through said throat into the bite of the feed rolls, there being a V-shaped trough between the upper portion of the inner end of the endless conveyor and the upper portion of the lower feed roll, the improvement comprising an antijamming member disposed in said trough and supported to extend transversely of the feed conveyor and having an upper surface which is curved in cross section and so positioned with respect to the endless conveyor and lower feed roll that material from the conveyor is directed over said curved surface into the bite of the feed rolls, the antijamming member being spaced from the inner end of the endless conveyor a distance sufficient to permit passage of the conveyor flights but a distance insufficient to permit ear corn to pass downwardly between the endless conveyor and antijamming member.

2. A forage harvester as claimed in claim 1 wherein the antijamming member is a pipe.

3. A forage harvester as claimed in claim 1 in which there are supporting arms removably secured to the walls of the harvester throat to which the ends of the antijamming member are connected.

4. A forage harvester as claimed in claim 3 in which the ends of the antijamming member are removably connected to the supporting arms.

5. A forage harvester as claimed in claim 2 in which the supporting arms have downwardly projecting plate portions at their inner ends to which the ends of the antijamming member are connected.

6. A forage harvester as claimed in claim 1 in which there is a supporting member connected to each wall of the forage harvester throat, said supporting members having studs projecting toward each other, and in which the antijamming member is a pipe having open ends for receiving said studs.

7. A forage harvester as recited in claim 1 in which there is a supporting arm removably connected to each sidewall of the forage harvester throat, each arm being located in a horizontal plane adjacent the upper portion of the inner end of the endless conveyor, and the inner ends of said arms having depending portions located opposite the ends of the trough, each depending portion having an inwardly projecting stud on which the antijamming member is supported.

8. A forage harvester as recited in claim 7 in which the antijamming member is a pipe having open ends each receiving one of said studs.